March 16, 1937. E. J. KOSER 2,073,991
FILTER
Filed June 9, 1936
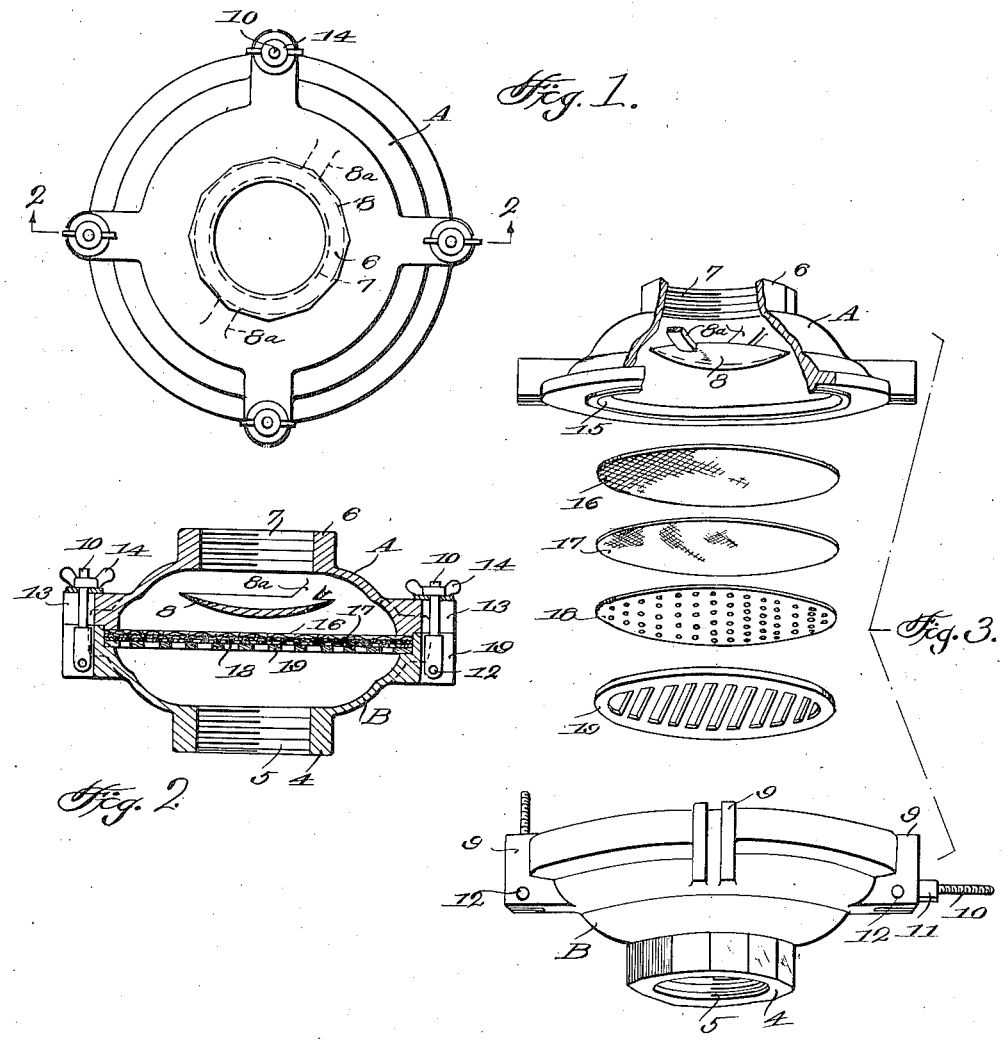
Inventor
Edward J. Koser
By Munn Anderson & Liddy
Attorney Patented Mar. 16, 1937

2,073,991

UNITED STATES PATENT OFFICE 2,073,991

FILTER

Edward J. Koser, Mason City, Iowa

Application June 9, 1936, Serial No. 84,372

1 Claim. (Cl. 210—84)

My invention relates to improvements in filters and it consists in the constructions, combinations, and arrangements herein described and claimed.

The main purpose of the invention is to provide a filter which can be used by creameries and others who desire to have foreign matter removed from fluid, such as water, and so constructed that it can be readily taken apart for cleaning and can be readily reassembled.

A further object is to provide a filter of the type described which can be attached to a source of water under pressure and in which the direct force of the water is dissipated by means of a baffle which throws the water to the inner walls of the filter body, thus preventing the force of the water from perforating a cotton filter cloth which forms part of the filter and which would be soon destroyed were not the force of the water thus diverted.

A further object is to provide a device of the type described in which the force of the water is diverted so that matter which might pass through the filter is held therein due to the reduction in the force of the water.

Other objects and advantages will appear in the following specification and the novel features of the invention will be particularly pointed out in the appended claim.

My invention is illustrated in the accompanying drawing forming part of this application, in which:

Figure 1 is a plan view of the device,

Figure 2 is a section along the line 2—2 of Figure 1, and

Figure 3 is a perspective view showing the various parts separated but in the same relative positions as they are when the device is assembled.

In carrying out my invention I provide a body portion made of two sections A and B as shown in the drawing. These sections are preferably made of aluminum castings. The section B is provided with a boss 4 having a threaded opening 5 which serves as an outlet. The section A is provided with a similar boss 6 and a threaded inlet 7. These inlet and outlet portions are designed to be attached to threaded inlet and outlet pipes (not shown).

The section A has a baffle plate 8 which is disposed within the section, as shown in the drawing, and which is preferably cast integrally therewith. The baffle is dish-shaped or concave on that surface which faces the inlet 7 and is held in position preferably by extensions 8ª at each end thereof which, as stated, are formed integrally with the walls of the body section A.

The body section B is provided with radially extending spaced-apart ears 9. These ears are arranged in pairs as shown in the drawing and between each pair there is pivotally connected a screw bolt 10 having a flattened portion 11 which extends between the ears and is secured in position by means of a pivot pin 12.

The body section A is provided with similar pairs of ears 13 arranged to receive the screw bolts 10. The latter are provided with winged nuts 14 so as to hold the sections together.

Each section is provided with an annular recess such as shown at 15 in section A of Fig. 3. These recesses are in registration and are designed to hold the other members of the filter to be described.

In Fig. 3 I have shown a wire mesh disc 16 which is of a size to enter the recess 15. Next to this disc is a cotton filter cloth disc 17. At 18 I have shown a perforated plate or sieve and at 19 a grid.

In assembling the device the parts are placed in their respective positions as shown in Fig. 3. The body portions A and B are placed in position with the ears 9 registering with the ears 13, the pivoted screw bolts are swung into position, and the nuts 14 are tightened so that the parts are held securely in the position shown in Figure 2.

From the foregoing description of the parts of the device the operation thereof may be readily understood. When the water is turned on and comes through the inlet 7 it strikes the concave face of the baffle 8 and is deflected rearwardly and outwardly against the sides of the filter section A and thence flows through the wire mesh disc, the cotton filter cloth, the sieve, the grid, and out through the exit opening 5. The grid 19 is preferably an aluminum plate with bars as shown and it holds the other parts of the filter in firm position, the parts being clamped as stated by the wing nuts 14.

Were it not for the baffle 8 the force of the water would soon disintegrate the cotton filter cloth 17 and this would let through matter which is otherwise retained by the construction, such as described, where the force of the water is dissipated by first striking the baffle.

The device is easy to assemble and easy to clean and can be used for filtering various liquids but, as stated, it is particularly adapted for filtering water under pressure.

When the filter is taken apart the screens are cleaned and the cotton filter is removed and a new one inserted in its place.

I claim:

A filter comprising a pair of registering sections, one of said sections having an inlet and the other section having an outlet, filtering members including a cloth filtering disc clamped between the sections, means for clamping said sections and filtering members together, a baffle having diametrically disposed arms integrally connecting the baffle to one of the sections and located between the inlet and the filtering members, the face of the baffle opposite the inlet being concave, the opposite face adjacent the filtering members being convex, the space between the baffle and the filtering members being free of obstructions, the walls of the baffle tapering from the center to the periphery thereof so that said periphery will present a thin edge over which liquid will be discharged.

EDWARD J. KOSER.